United States Patent [19]

Nanni

[11] 4,025,690
[45] May 24, 1977

[54] METHOD OF PREPARING ADDITIVES AND ADDITIVES PREPARED ACCORDING TO SAID METHOD

[75] Inventor: Augusto Nanni, Bologna, Italy

[73] Assignee: Reagens S.p.A. Industria Chimica, Bologna, Italy

[22] Filed: Apr. 19, 1974

[21] Appl. No.: 462,391

Related U.S. Application Data

[63] Continuation-in-part of Ser. No. 160,176, July 6, 1971, abandoned.

[30] Foreign Application Priority Data

July 6, 1970 Italy .................................. 51934/70

[52] U.S. Cl. .................................. 428/407; 427/221; 427/374 R; 427/385 R; 260/42.56; 260/45.75 V
[51] Int. Cl.² ...................... B05D 7/00; B05D 3/02; C08J 3/22; C08K 3/10
[58] Field of Search ............. 117/16, 100 C, 100 A, 117/100 B, 100 M; 252/400 R; 260/45.75 R, 42.56, 45.75 V; 427/221, 222, 385, 374; 428/407

[56] References Cited

UNITED STATES PATENTS

| 2,337,128 | 12/1943 | Plummer | 117/100 B |
| 2,530,852 | 11/1950 | Bixby | 260/34.2 |
| 3,054,751 | 9/1962 | Blake et al. | 117/100 M |
| 3,138,563 | 6/1964 | Morgan et al. | 117/100 B |
| 3,265,644 | 8/1966 | Herman et al. | 117/100 A |
| 3,461,081 | 8/1969 | Sugahara et al. | 117/100 B |

OTHER PUBLICATIONS

Data Sheet No. 13, Dibasic Lead Phosphite, July, 1965.
Data Sheet No. 19, Lead Stearate, April, 1964.
Data Sheet No. 20, Dibasic Lead Stearate, April, 1964.

*Primary Examiner*—Michael R. Lusignan
*Attorney, Agent, or Firm*—Kenyon & Kenyon Reilly Carr & Chapin

[57] ABSTRACT

Dusty additives intended to be used as stabilizer, lubricants, etc. in a polymer or copolymer of vinylchloride are firstly mixed with said polymer or copolymer of vinylchloride, or of acrylonitrile, or of butadiene or of styrene in granular form, e.g. in the form in which they are rendered by a suspension polymerization process, at a temperature of 167° to 230° F., and then cooled to obtain that these additives come into the granules of polymer or copolymer, retaining the same granulometry of this polymer or copolymer granules, with said additive constituting up to 5/6 of the resulting mixture.

7 Claims, 6 Drawing Figures

METHOD OF PREPARING ADDITIVES AND ADDITIVES PREPARED ACCORDING TO SAID METHOD

This application is a continuation-in-part of application Ser. No. 160,176, filed on July 6, 1971 now abandoned.

SUMMARY OF THE INVENTION

This invention relates to a method of pretreating dusty stabilizing additives for vinylchloride polymers and copolymers, acrylonitrile, butadiene and styrene in order to render them readily dispersible in a free-flowing unpowdery form in which they may be easily dispensed.

The best ways of using, or more exactly, most practical methods of using synthetic polymers and copolymers depend generally on the introduction of additives which permit their transformation into a final product and which modify its characteristics in dependence upon the end to be served.

The additives most commonly introduced are plasticizers, stabilizers, lubricants, fillers, antioxidants, antistatic agents and coloring agents.

With respect to polyvinylchloride and its copolymers, the stabilizers which prevent or attenuate its degradation under heat and light have a predominating importance. In effect, high temperatures are attained in machines such as mixers, extruders, calenders, etc., which are capable of causing great alterations. Moreover, the end product itself when subjected to the influence of different atmospheric agents, must be in a state to resist degrading action.

The use of lubricating agents is also important, and substances employed for this purpose often contribute also to the stabilizing function and include metallic soaps, for example. The most suitable addition for a certain class of polymers and copolymers is difficult to provide by means of a single product. Generally it is more advantageous to add several additives of the same class, for example more stabilizers, more lubricants, etc., in combination. This is particularly true for stabilizers. Polyvinylchloride and its copolymers must always have stabilizers added to them in order to be protected against the degrading factors hereinbefore mentioned. Lubricants are also necessary. Among the compounds most frequently employed are the chemical derivates of lead, barium, cadmium, calcium, zinc, etc., singly or in combination. Organic inhibitors, complexing agents and anti-oxidant agents may also be used. The greater part of these auxiliary products and especially those derived from lead, which are very efficacious, and economical, are in the form of very fine toxic powder.

The use of these additives and particularly the use of stabilizers, leads to difficulties because of a series of problems which derive essentially from the physical nature of the powder (powderiness and poor pouring properties) and the chemical nature (toxicity) of the additives themselves. It suffices to note, among other things, that the physical nature of the additives in the form of impalpable powders renders difficult and imprecise the necessary operation of weighing, feeding and mixing. The feeding and mixing difficulties are particularly troublesome because of the poor pouring qualities of the products in the hopper. The difficulties resulting from these properties is enormously increased when it is necessary to use several additives for the same class (for example, stabilizers) combined together.

The toxicity of these additives is, among other problems, aggravated by their physical nature since in order to avoid having the personnel handling these impalpable powders breathe them in or become contaminated by them, it is necessary to provide expensive installations which are not yet entirely satisfactory in their operation.

It clearly follows that a technical problem of the first importance in the technology of plastic materials in general and polyvinylchloride in particular, consists in rendering the usual additives available in a form which is easy to handle, smooth-flowing and unpowdery, in order to permit exact proportioning and eliminate the noxious effects of their toxicity, without having recourse to the use of large and expensive installations.

It is of great importance to provide these dusty additives not only in a non-powdery and granular form, but in a free-flowing form, and with a predetermined granulometry, in order to facilitate the fall-out from the hoppers during the transport feeding and stocking operations, and in order to facilitate their homogeneous dispersion into the polymers to which they are designed.

In particular the predetermination of the granulometry of the end product, and the possibility of conditioning the additives without making use of binding agents other than vinylchloride polymers, are the most important unsolved problems up to now.

It is an important feature to obtain some additives such as stabilizing agents and lubricating agents, rendered in non-powdery form in the absence of plasticizing agents; these latter are in effect highly undesired in the manufacture of rigid vinyl products.

The technical problem hereinbefore set forth has been the object of a number of proposed solutions, each of which nevertheless has imperfection and limitations with respect to the dispensing of the product or, in certain cases, with respect to the possibility of employing additives in the forms proposed.

Mixtures of stabilizing agents containing lead derivatives and plastifiers, in the form of a paste or of humectified powders, according to the percentage of plastifier employed, are already known. The pastes are nevertheless not easy to handle and tend with time to stratify, leading to a substantial waste of the product which remains stuck to the internal walls of the container. Even the humectified products are not exempt from certain disadvantages and limitations in use. For example, such mixtures are not suitable for the manufacture of rigid vinyl products, the production of which is on the increase, because even the minimum quantities of plasticizer thus introduced appreciably compromises its mechanical properties.

Mixtures of different additives made up into little packets of suitable plastic material dosed according to the needs of the users have been suggested. Aside from the high price, and the scarcely decreased danger, the fundamental disadvantage of this expedient consists in imposing a rigid formulation on the user. When he is obliged to modify the formulation to compensate for the inevitable variations of other factors having an influence on the treatment, he must again have recourse to separate undosed additives, or use numerous combinations of different ingredients.

Granules made of stabilizers (and in particular basic lead stabilizers, calcium stearates, and lead stearates)

and one or more binding agents based on organic product having a low melting point, such as fatty acids and alcohols esters etc., having lubricating properties, have been suggested. Such granular materials may be stored in tanks and weighed with an automatic balance but they are still partially powdery and rendered in an insufficiently free-flowing form, and by consequence they are difficult to dispense.

Satisfactory dispersions thereof are not produced with slow speed mixers, or if sufficiently high temperatures are not used, or if the mixing time is not long enough. These disadvantages are particularly accentuated in plasticized products and in plastisols.

The substantial quantity of binding agent which usually has lubricating properties or modifying properties as well, limits the quantity of granular material which may be used in a mixture. In effect, if it is necessary to increase the quantity of stabilizer the dose of agglomerating material increases automatically therewith, and this may not be acceptable for the conditions under which the user is operating. It must also be taken into account that, in the production of certain products, the type of lubrication characteristic of the binding agent may be unsuitable or even undesirable.

Summarizing what has been said, the problems mentioned have still not been solved to entire satisfaction. In particular there has been no solution to the problem of rendering readily available to the user a single additive in an appropriate form. However, agglomerates composed of at least two additives have been suggested. These may force the user to a formulation of the synthetic product which utilizes a type of additive which is not desired. This has rendered practically inefficacious the remedies proposed in several fields.

In this disclosure "granular" means the form in which the polymers or copolymers of vinylchloride, acrylonitrile, butadiene, styrene, or some other synthetic polymer are usually rendered by a suspension polymerization process; the wording "granule" means a single body or particle of this polymers, which has a size of 150 to 500 microns. On the contrary, as used in this disclosure, granular form does not refer to the form in which are usually rendered the "granular polyvinylchloride compounds" in which the size of the granules is about 2 to 5 mm.

The object of the present invention is to provide a single additive, for example, a stabilizer, a lubricant, or a plurality of additives in a free-flowing non-powdery form to permit it to be easily fed in accurate proportions and easily handled without having any toxic effect on the operator.

A further object of the present invention is to provide even a single additive, for example a stabilizer or a lubricant, or a complex of additives of this type, in free-flowing non-powdery form without using binding agents other than polymers and copolymers of vinylchloride in granular form.

A further object of the present invention is to provide an additive of the type above, in a granular form, in which the size of the granules may be easily predetermined in the range of the usual granulometry of the polymers and copolymers of vinylchloride preferably manufactured by a suspension or a mass polymerization process; this granulometry is 150 to 500 microns.

A further object of the present invention is to provide a granular additive as above which presents a free-flowing property of the same order of the free-flowing property of the polymers and copolymers of vinylchloride preferably manufactured by a suspension or a mass process.

This makes it possible for the user to have available the additive in a suitable form for convenient use immediately in a harmless manner, without any addition of undesired substances, so as to permit maximum possible variation of the formula of the final vinylchloride polymer produced. This solution of the problem leads to a process for pretreating additives and naturally to the pretreated additives obtained thereby. Specifically, a composition of additives for plastic materials (in particular stabilizers, in a non-powdery free-flowing form) is obtained by starting with conventional powdered additives and letting these additives be absorbed by a polymer or a copolymer of vinylchloride in granular form.

This invention is based upon the observation that a granule of a polymer or of a copolymer of vinylchloride has a porousness which has a ratio between the true and the apparent density of about 1.4. The size of the hollows in the granules is of the same order as the size of the particles of the additives, specifically of 3 to 15 microns. Furthermore, the true density of the powdery additives is 1 to 7 gr/cm$^3$ and the bulk density of a dusty mass of these additives is 0.5 to 1.5 gr/cm$^3$. Under normal conditions it is not possible to fit some additive particles into the hollows of a single polymer or copolymer granule.

It has been surprisingly observed that at certain predeterminable temperatures the additive particles fit into the hollows of the polymer granules without varying the structural properties of these granules. The end product so obtained has a density of 1 to 2 gr/cm$^3$. This temperature lies between the softening point of the polymer or copolymer granules, and the temperature at which these granules become sticky and adhere to one another. For the polymers and the copolymers of vinylchloride this temperature lies between 167° and 230° F.

Due to the difference between the true and the apparent density of the polymer and copolymer granules, and the true and bulk density of the additive dusty mass, up to 5 parts by weight of additive may come into a part of granular polymer or copolymer of vinylchloride.

Furthermore, the volume of the end product is of the same order as the volume of the granular starting polymer or copolymer.

A better understanding of this may be evident from the annexed drawing, in which.

Figure 1:
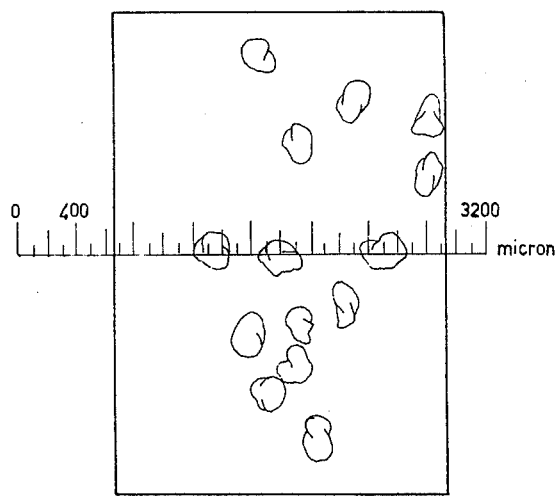
FIG. 1 shows some polymers granules enlarged about 25 times.
Figure 2:
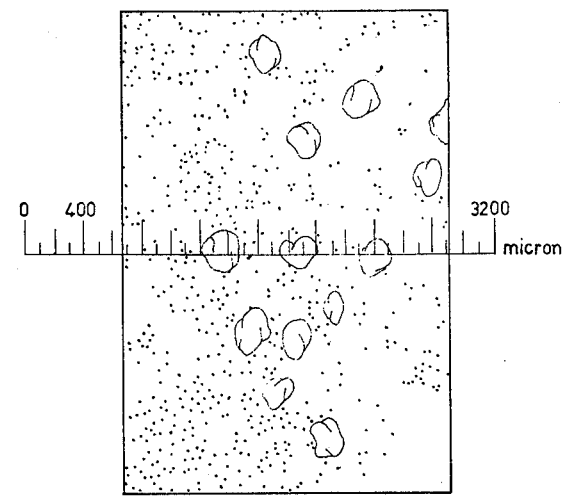
FIG. 2 shows some additives particles mixed with polymer granules enlarged about 25 times.
Figure 3:
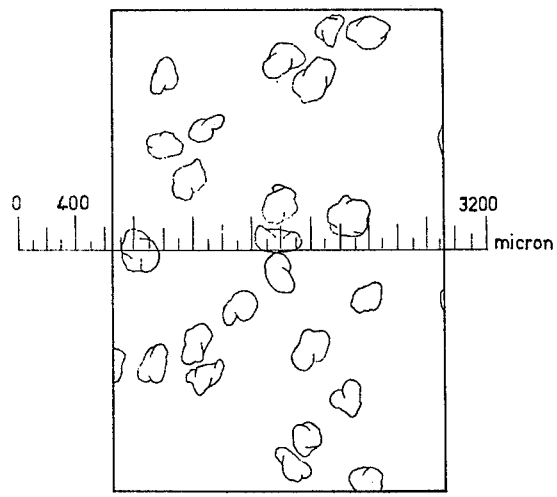
FIG. 3 shows some granules of the polymer englobing the additive particles, after being processed according to the invention, enlarged about 25 times.
Figure 5:
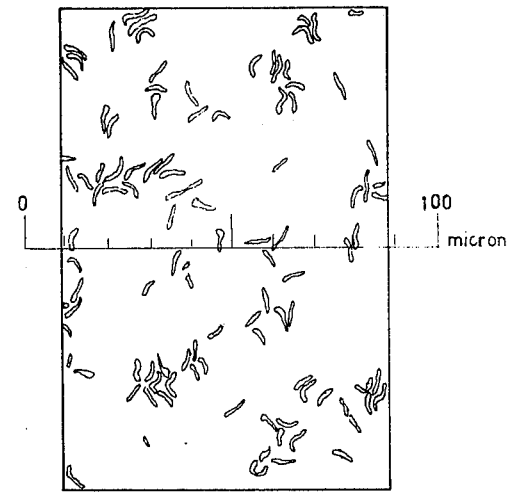
FIG. 5 shows an additive particle (Pb HPO . 2 Pb O$_3$. ½H$_2$O - dibasic lead phosphite) enlarged about 700 times.
Figure 4:
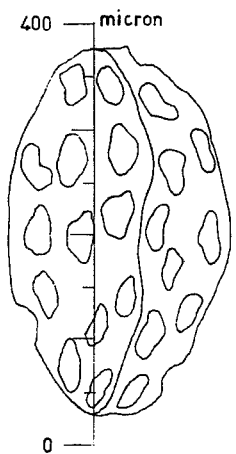
FIG. 4 shows a polymer granule partially sectioned, enlarged about 150 times.
Figure 6:
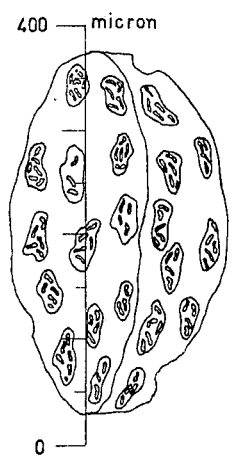
FIG. 6 shows a granule of polymer, englobing several particles of additive, enlarged about 150 times.

A suitable process consists in treating said additives and the polymers or copolymers in a mixer while raising the temperature to obtain absorption of the additive by the particles of the polymer, or the copolymer. In order to obtain sufficient incorporation, the ratio of additive to the polymer or to the copolymer must be between 1 to 5 and 5 to 1 depending on the physico-chemical characteristics of the additive which is to be incorporated and those of the polymer or copolymer itself. The mass is then cooled to the ambient temperature.

Before this operation, the additives are normally in a finely powdered form, with a granulometry of 5 to 15 microns, and the polymer or copolymer particles have dimensions of some hundreds of microns if it is of the type polymerized in suspension. After the operation described we obtain particles having the same granulometry as that of the polymer employed.

There is thus obtained a material which is not powdery and flows easily, which has no tendency to agglomerate. The product thus obtained may be utilized in any conventional technology as additive for transforming rigid products, plasticized products and pastes (plastisols) without particular measures to facilitate its dispersion.

It should be pointed out that during the preparation of these additive concentrates there is no recourse to the introduction of foreign substances, that is to say other than those chosen by the user, which may exercise an undesired influence on the product. The products which represent the object of the present invention may even consist of a single additive and naturally of the polymer or copolymer. Using this technique it is also possible to make available to the user a series of additives corresponding to those heretofore used which permit him to avoid varying the overall composition of any formula heretofore employed to his satisfaction.

By way of example the additives may be neutral or basic inorganic lead salts, such as phosphates, silicates, and carbonates, for example, basic lead carbonate, phosphites such as dibasic lead phosphite, sulfates of diverse basicity, neutral or basic organic lead salts, such as dibasic lead salicylates, maleates, fumarates, laurates, ricinolates, palmitates and stearates, such as neutral, basic and dibasic, lead stearate, as well as the neutral or basic compounds and soaps of cadmium, zinc, barium, calcium, magnesium, strontium, manganese and of alkalis or mixtures thereof, for example, barium-cadmium, calcium-zinc, etc., which for synergistic effects are most efficacious in combination with organic inhibitors, antioxidants, and complexing agents of various types. It is also possible to use organo-stannic compounds. As has been mentioned, even a single component, for example a single stabilizer, as well a combinations of different stabilizers, may be incorporated in a polymer.

As vinylchloride polymers or copolymers the following may be used: homopolymers polymerized preferably in suspension, or in mass, and copolymers of vinylchloride in a major proportion and other copolymerizable monomers in a minor proportion, such as the copolymers of vinylchloride and vinyl acetate, the copolymers of vinylchloride and vinylidene chloride, the copolymers of vinylchloride with maleic or fumaric acid, and the copolymers of vinylchloride with styrene.

It is also possible to use mixtures of polyvinylchloride with other synthetic polymers or copolymers compatible therewith such as chlorinated polyethylene or a copolymer of acrylonitrile, butadiene and styrene, in order to contribute to the attainment of the desired properties in the end product.

Synthetic polymers or copolymers granules other than vinylchloride polymers and copolymers may be used according to this process alone or in combinations, and they will operate in the same way as vinylchloride polymers or its copolymers in absorbing the dust particles on their surface.

The process according to the invention will be better understood from the following Examples, which refer to polyvinylchloride, and which are given purely by way of illustrating and non-restricting examples:

EXAMPLE 1

In a high-speed mixer having a capacity of 100 liters are introduced 10Kg. of polyvinylchloride (for Example "Sicron 540" a suspension homo-polymer of PVC having a K value of 63–65 produced by Montecatini-Edison) and 10 Kg. of dibasic lead phosphite. The container is heated by circulating water at 176° F. through a jacket. The mixer is operated first at low speed and finally at 1600 revolutions a minute. The temperature increases in 18 minutes to 230° F. The speed is then reduced and the mass is cooled by circulating cold water in the jacket.

At 176° F. the product is discharged. The lead phosphite particles are incorporated in PVC, but the PVC granules are not agglomerated. Indeed, on microscopic examination the granules appear to have a uniform granulometry between 300 and 400 microns. This product is used in mixtures in which it is necessary to introduce dibasic lead phosphite as a stabilizing agent. Its introduction is facilitated by the free-flowing and non-powdery properties of the product.

EXAMPLE 2

A charge consisting of 10 Kg. of polyvinylchloride (for example "Sicron 540" a suspension homo-polymer of PVC having a K value of 63–65 produced by Montecatini-Edison), 6 Kg. of dibasic lead phosphite, 2.7 Kg. of dibasic lead stearate, and 0.75 Kg. of calcium stearate, is introduced into the high-speed mixer used in Example 1. The mixer is operated first at slow speed and then at a higher speed. After 14 minutes the internal temperature reaches 230° F. The mixture is then cooled to 176° F. and the mass discharged. The particles are incorporated in PVC. The mixture may be used as a stabilizing and lubricating complex for the production of rigid tubes or profiles for rolling shutters.

Comparative tests have been made between the effect of stabilizers treated according to the present invention and those of conventional powders.

The appearance of the end product manufactured by using the treated stabilizers of the present invention shows lower degradation during the transformation. Moreover, the residual stability is surprisingly higher. Over and above the other advantages it has also been noted that there is a better result with respect to dispersibility tests.

An evident advantage for the user results from the fact that the use of additives according to the present invention instead of conventional stabilizers and lubricating agents may render in most cases pregelification of the entire mass superfluous and then shorten the processing time.

It will be understood that the invention is not limited to the specific examples hereinbefore described and that they may be modified as to detail without thereby departing from the basic principles of the invention as defined by the following claims.

What is claimed is:

1. A process for treating dusty stabilizing or lubrication additives for a homopolymer and copolymer of vinyl chloride, acrylonitrile, butadiene or styrene to convert said dusty additive to a free-flowing, non-dusty form, comprising:
   a. Mixing at least one of said dusty additives in powdered form with non-dusty particles of at least one of said polymers in the absence of a plasticizer, the additives constituting from 1/6 to 5/6 of said mixture;
   b. Heating said mixture, while continuing said mixing, to a temperature sufficient to cause particles of said dusty additive to be absorbed by the non-dusty particles of said polymer, without changing the particle size or causing agglomeration of said polymer particles; and
   c. Cooling said mixture.

2. Process according to claim 1 wherein said polymer is a homopolymer or copolymer of acrylonitrile, butadiene or styrene.

3. Process according to claim 1 wherein said polymer is a homopolymer or copolymer of vinyl chloride.

4. Process according claim 1 wherein said temperature sufficient to cause said absorption is from 167° C to 230° F.

5. A particulate, non-dusty, free-flowing additive polymer concentrate free of a plasticizer for a rigid homopolymer and copolymer of vinyl chloride, acrylonitrile, butadiene or styrene, said concentrate comprising:
   a. Particles of at least one dusty stabilizing or lubricating additive;
   b. Particles of said polymer having dimensions obtained by forming said polymer by a suspension polymerization process;
   c. Said particles of said additive being absorbed by said particles of said polymer, whereby the particles of polymer with absorbed additive have the same dimensions as the polymer particle prior to such absorption; and
   d. The weight ratio of said additive to said polymer being from 1:5 to 5:1.

6. A polymer concentrate according to claim 5 wherein said additive is a powder selected from the group consisting of neutral basic compounds of lead, zinc, barium, calcium, magnesium, strontium and manganese.

7. A polymer concentrate according to claim 5 wherein said polymer is a homopolymer or copolymer of vinyl chloride.

* * * * *